Patented Feb. 22, 1949

2,462,564

UNITED STATES PATENT OFFICE 2,462,564

SEPARATION OF POLYMERS

John R. Skeen, Philadelphia, Pa., assignor to Sun Oil Company, Philadelphia, Pa., a corporation of New Jersey No Drawing. Application February 9, 1945, Serial No. 577,144

6 Claims. (Cl. 260—96)

The present invention relates to fractionation of polymeric materials with respect to molecular weight and particularly concerns the separation of polymers comprising chain-like molecules of varying molecular weight into fractions of relatively high and relatively low average molecular weights. The invention especially concerns a method of effecting such separation by selective adsorption on a granular adsorbent such as silica gel.

The method of the present invention is particularly useful in resolving rubber-like polymeric materials into fractions having different average molecular weights and different physical properties. Examples of such materials are isobutylene polymers, butadiene-styrene copolymers, natural rubber, three-component interpolymers of isobutylene-butadiene-styrene or like rubbery materials. The invention also may be used to effect separation of polymers of the thermoplastic type, such as polyisoprene, polycyclopentadiene, polystyrene and coumarone-indene resins. However, the invention is not confined in scope to treatment of polymers of the above-named types since the segregation of chain-like polymers in general into fractions of different average molecular weights and different physical properties may be accomplished in accordance therewith.

One method heretofore proposed for making separations of the type herein concerned involves fractional precipitation of the polymeric material from solution. Such method may be carried out by dissolving the polymers in a suitable solvent such as benzol and then adding to the solution an anti-solvent such as acetone or alcohol in amount effective to cause part of polymers to separate from solution. The higher molecular weight polymers, being the least soluble, separate first. By adding incremental portions of anti-solvent and removing the insoluble polymers after each addition, the starting material may be resolved into any desired number of fractions varying in average molecular weight. This method, however, has proved to be rather impractical particularly for large-scale or commercial use.

According to the present invention, the polymers are separated with respect to molecular weight by selective adsorption on silica gel or other adsorbent material substantially conforming to silica gel in adsorptive properties. This selective adsorption is accomplished by forming a solution of the polymeric material in a suitable solvent such as a saturated hydrocarbon liquid and treating the solution with the adsorbent, preferably by percolating the solution through a bed of the adsorbent. I have found that the polymers of relatively low molecular weight are preferentially retained by the adsorbent while the polymers of relatively high molecular weight tend to remain in solution and pass out along with the solvent.

Further, in accordance with the invention, the polymer fraction retained by the adsorbent is removed therefrom by treating the adsorbent with a primary desorbing agent which is sufficiently adsorbable to displace the polymer therefrom but which leaves the adsorbent in an inactivated state due to adsorbed primary agent. Examples of suitable primary agents are benzene and ethylene dichloride. The primary agent, in turn, is displaced by treating the adsorbent with a secondary desorbing agent which has a relatively low degree of adsorbability, such as a saturated hydrocarbon or other organic liquid substantially conforming thereto in adsorbability properties, thereby to reactivate the adsorbent and condition it for further use. Heptane is one example of the type of organic liquid suitable as the secondary desorbing agent.

For practicing the desorbing steps of the process, the primary desorbing agent should be sufficiently strongly adsorbable to be capable of displacing the adsorbed polymers but not so strongly adsorbable as to be incapable, itself, of displacement by means of the secondary desorbing agent. I have found that organic liquids having the properties hereinafter set forth meet these requirements and are suitable primary desorbing agents.

In order that the primary desorbing agent be capable of removing the polymers, it should be "more strong adsorbable" by the particular adsorbent used in the process than are the polymers which it is to displace. This may be determined by means of the adsorption isotherm for a binary mixture of the primary agent and the polymers. If the adsorption isotherm shows that an organic liquid is preferentially adsorbed from binary mixture with the polymers throughout more than 50 per cent of the concentration range, it may be said, for the present purpose, that it is "more strongly adsorbable" than the polymers and therefore is capable of displacing them. It, accordingly, would meet the first requirement for a suitable primary desorbing agent.

The second requirement, namely, that the primary desorbing agent be not so strongly adsorbable as to be incapable of being displaced by the secondary desorbing agent, may be determined from the adsorption isotherm for a binary mixture of the primary and secondary agents. As a measure of the relative adsorbabilities for this purpose, the amount of primary agent adsorbed by the adsorbent when the latter is in equilibrium with a solution of primary and secondary agents containing 0.2 per cent by volume of the primary agent has been chosen, and this amount is herein termed the "adsorption index" of the primary agent. It has been found that inorganic liquids which have an "adsorption index" not exceeding 40 are capable of being displaced by the secondary desorbing agent. Organic liquids which have "adsorption indexes" within the range of about 7 to about 20 give best results and are preferred as the primary desorbing agent.

As used herein in both the description and claims, the "adsorption index" of a compound may be defined as the number of cubic centimeters of the compound adsorbed by one kilogram of the adsorbent when the latter is in equilibrium with a solution consisting of 0.2 per cent by volume of the compound and 99.8 per cent by volume of the secondary desorbing agent employed in the process. For example, if silica gel is to be used as the adsorbent and pentane as the secondary desorbing agent and it is desired to determine whether or not benzene would be a satisfactory primary desorbing agent, then the "adsorption index" of benzene would be determined as the number of cubic centimeters of benzene adsorbed by one kilogram of silica gel when in equilibrium with a solution consisting of 0.2 per cent benzene and 99.8 per cent pentane by volume. The "adsorption index" thus is a measure of the adsorbability of the primary desorbing agent from solution with the secondary agent, and, since adsorption is an equilibrium phenomenon, therefore is also a measure of the ease with which the primary agent may be displaced from the adsorbent by means of the secondary agent. An "adsorption index" of zero would indicate that there is no difference in adsorbabilities of the two materials. As the "adsorption index" increases, the amount of secondary agent required to effect displacement of the primary agent increases. When the "adsorption index" has a value above about 40, the adsorbed primary agent can be displaced only if an unreasonably large amount of the secondary agent is used.

A convenient method of ascertaining the "adsorption index" comprises obtaining several points on the adsorption isotherm for a mixture of the primary and secondary agents at concentrations below 5 per cent primary agent and then extrapolating or interpolating to an equilibrium concentration of 0.2 per cent primary agent. Methods of determining the adsorption isotherm within any desired concentration range are well known to the art and need not be described herein. For the present purpose, determination of the adsorption isotherm should be made at substantially the same temperature as used in the process, which preferably is ordinary temperature, in order that the "adsorption index" will be a measure of the relative adsorbabilities at the temperature of operation.

For the purpose of illustrating how suitable desorbing agents may be selected according to their "adsorption indexes," the following tabulation gives values which have been obtained for several pairs of organic liquids:

| Primary Liquid | Secondary Liquid | Adsorption Index of Primary Liquid |
|---|---|---|
| methylcyclohexane | n-heptane | 0.2 |
| carbon tetrachloride | do | 0.8 |
| benzene | do | 8 |
| ethylene dichloride | do | 18 |
| ethyl ether | methylcyclohexane | 68 |
| acetone | do | 160 |
| methyl alcohol | do | 196 |

The relatively low value of 0.2 for methylcyclohexane in n-heptane indicates that the difference in adsorbabilities of naphthenes and of paraffins, as exemplified by these two specific members of these hydrocarbon types, is negligible insofar as the present process is concerned. Either methylcyclohexane or n-heptane is a good example of the secondary desorbing agent. Other examples are n-butane, isobutane, n-pentane, isopentane, cyclopentane, isohexane, n-hexane, cyclohexane, octanes, etc., or mixtures of such hydrocarbons such as petroleum ether. In fact, any saturated hydrocarbon which is liquid under the conditions of operation could be used as the secondary desorbing agent. Furthermore, some organic liquids other than hydrocarbons are suitable as the secondary desorbing agent. For example, carbon tetrachloride, which, as shown above, has an "absorption index" in n-heptane of only 0.8, has an absorbability substantially equivalent to that of saturated hydrocarbons and therefore may be used as the secondary desorbing agent. For the present purpose, it may be considered that any organic liquid which, in binary solution with a saturated hydrocarbon such, for example, as heptane, has an "absorption index" less than about 2 is substantially equivalent to saturated hydrocarbons and therefore may be used as the secondary desorbing agent. Preferably the liquid used as the secondary desorbing agent is the same as that used in the process as a solvent for the starting polymers.

Benzene has been found to be more strongly absorbable than long-chain polymers and therefore capable of desorbing them. Since benzene has an "adbsorption index" of 8 as shown above, it is also capable of being, in turn, displaced by means of the secondary type of desorbing agent. Benzene is thus an excellent primary desorbing agent. Toluene, xylene and other benzene derivatives likewise are suitable primary agents.

Ethylene dichloride, which also is more strongly absorbable than long-chain polymers and which has an "absorption index" of 18, is another example of a very satisfactory primary agent. Other halogenated hydrocarbons, including iodine, bromine and fluorine derivatives likewise are satisfactory. However, halogenated hydrocarbons which have a symmetrical molecular structure, such as carbon tetrachloride, in general are too weakly adsorbable to displace the polymers and are not suitable as the primary agents but rather have the properties required of the secondary agent.

Ethyl ether is too strongly adsorbable, as shown by an "adsorption index" of 68, to be displaced by reasonable amounts of the secondary agent and therefore is not a suitable primary agent. Acetone and methyl alcohol have such high indexes that, for all practical purposes, it may be considered that they are incapable of being displaced by means of the secondary type of desorbent. Some oxy-hydrocarbons, however, which are not too highly polar may meet the requirements for a satisfactory primary desorbent.

The following examples serve to illustrate specific embodiments of the invention and are given merely by way of illustration:

Example I

The starting material was a vulcanizable rubber-like polymeric material which had been prepared by interpolymerizing a mixture comprising 50 parts of isobutylene, 30 parts of butadiene and 20 parts of styrene at a temperature of $-35°$ C. to $-40°$ C. by means of 4 parts of $AlCl_3$ used in the form of a slurry in ethyl chloride. The starting polymers had a penetration of 212 (ASTM method D-5-25). Five hundred grams of the polymers were dissolved in 2000 ml. of pentane and the mixture was percolated through 1800 grams of silica gel in a column 2½ inches in diameter and 30 inches in height. Polymers of relatively low molecular weight were adsorbed by the gel whereas those of relatively high molecular weight passed out of the column in solution with the pentane. The high molecular weight polymer fraction was recovered by evaporation of the solvent. The low molecular weight fraction was desorbed from the gel by percolating 7000 ml. of benzene through the column and was recovered from solution by evaporating the benzene. Yields and properties of the fractions were as follows:

|  | Yield | | | Appearance |
|---|---|---|---|---|
|  | Grams | Percent of charge | Penetration |  |
| High molecular weight fraction | 315 | 63.0 | 63 | hard, tacky. |
| Low molecular weight fraction | 168 | 33.6 | 600 | very soft, tacky. |
| Loss | 17 | 3.4 |  |  |
|  | 500 | 100.0 |  |  |

The difference in average molecular weight of the fractions is clearly indicated by the large difference in penetration values.

Example II

The present example illustrates the separation of polymers into a series of fractions of varying molecular weight. The starting material was an interpolymerization product of 45 parts isobutylene, 35 parts butadiene, and 20 parts styrene, formed under similar polymerization conditions as in Example I. It was a tacky rubbery material having the following properties: penetration 86 (ASTM method D-5-25); bromine No. 62.6. A column of approximately 1¾ inch diameter containing 750 grams of 28-200 mesh silica gel was used. The column was first filled to the top of the adsorbent with pentane in order to wet the gel and thereby substantially eliminate subsequent heat-of-wetting effects. A solution of 200 grams of the polymers dissolved in 775 ml. of pentane was then passed through the adsorbent, followed immediately by 1000 ml. of benzene. Approximately 500 ml. of the first filtrate, representing most of the liquid hold-up of the column, was discarded, after which nine filtrate cuts as tabulated below were taken. The polymer fraction was obtained from each cut by evaporating the solvent.

| Cut No. | Vol. of Cut, ml. | Solvent in Cut | Polymer Fraction (solvent free) | | | | | |
|---|---|---|---|---|---|---|---|---|
| | | | Wt. Per cent of Chg. | Penetration | | Refractive Index | Specific Disp. | Bromine No. |
| | | | | ASTM Method [1] | Modified Method [2] | | | |
| 1 | 125 | pentane | 8.2 | 0 | 1 | 1.5305 | 131 | 62.2 |
| 2 | 110 | do | 11.9 |  | 2.5 | 1.5300 | 131 |  |
| 3 | 110 | do | 11.7 |  | 6 | 1.5296 | 131 |  |
| 4 | 110 | do | 11.5 |  | 10 | 1.5293 | 131 |  |
| 5 | 110 | do | 12.5 |  | 11 | 1.5289 | 131 | 62.7 |
| 6 | 110 | do | 11.1 |  | 11.5 | 1.5289 | 131 |  |
| 7 | 110 | do | 8.9 | 19 |  | 1.5265 | 130 | 64.3 |
| 8 | 125 | benzene | 8.1 | 450 |  | 1.5198 | 129 |  |
| 9 | 1,000 | do | 11.0 | (fluid) |  | 1.5190 | 129 | 73.2 |

[1] 50 gram weight for 5 seconds.
[2] Similar to ASTM method but with 200 gram weight for 10 seconds.

The tabulated values for penetration show that the starting material was separated into fractions varying widely in degree of hardness, ranging from a very hard, brittle product to even a fluid, oily product. The small variations in specific dispersion and bromine number indicate that the polymers were relatively uniform in chemical composition (i. e., the various fractions contained approximately the same proportions of aromatic rings and unsaturate groups) and that the fractionation was effected primarily in accordance with molecular weight.

Example III

The present example illustrates one manner of practicing the invention in a cyclic type of operation wherein the used adsorbent is regenerated and reused.

The starting material was a rubber-like interpolymer product formed by polymerizing 40 parts isobutylene, 40 parts butadiene and 20 parts styrene with the temperature and catalyst as in Example I. It had a penetration of 82 and a bromine number of 54. A column 14 inches in diameter and 40 inches high packed with 160 lbs. of 28-200 mesh silica gel was used for separating a total of 480 lbs. of the starting material into two fractions which differed in molecular weight and hardness. In each cycle of operation, a solution consisting of 40 lbs. of the starting material dissolved in 18½ gallons of isopentane was percolated through the gel, after which 24 gallons of toluene were passed therethrough to desorb the relatively low molecular weight polymers which had been retained. This was followed by 38½ gallons of isopentane to displace the adsorbed toluene and restore the activity of the gel. This procedure was followed throughout 12 cycles. The solvents were removed from the two polymer fractions by evaporation and the corresponding fractions from each cycle were combined. Yields and properties of the fractions were as follows:

|  | Yield | | | |
| --- | --- | --- | --- | --- |
|  | Lbs. | Per cent of Charge | Penetration | Appearance |
| High mol. wt. fraction. | 285 | 59.4 | 30 | resinous, amber colored. |
| Low mol. wt. fraction. | 195 | 40.6 |  | viscous oily fluid. |

The present invention is not necessarily limited to the use of silica gel as the specific adsorbent, since other adsorbents conforming substantially to silica gel in adsorptive properties also may be utilized. Various activated clays, although generally having less efficient adsorptive properties than silica gel, may meet the requirements satisfactorily. The primary desorbing agents suitable for use with other desorbing agents will, in gengeneral, be those employed with silica gel, although they will not necessarily be the same in all cases. In choosing a primary desorbing liquid for use with a specific adsorbent, it is only necessary to determine that the liquid in question meets the two requirements, specified above, of being more strongly adsorbable by the particular adsorbent used than is the polymer fraction which is to be displaced, and of having an "adsorption index" not exceeding 40.

In choosing desorbing agents for practicing the process, it is desirable that they be so selected with respect to boiling point that they may be easily separated from the products and from each other by distillation. The desorbing agents, of course, should have no tendency to react (e. g. polymerize) in the presence of the adsorbent under the operating conditions.

What I claim and desire to protect by Letters Patent is:

1. Method of separating polymers comprising chain-like molecules of varying molecular weight into fractions of relatively high and relatively low average molecular weights which comprises forming a solution of said polymers and a saturated hydrocarbon solvent, contacting the solution with silica gel to selectively adsorb polymers of relatively low molecular weight while leaving relatively high molecular weight polymers in solution and separating from the adsorbent the treated solution containing the high molecular weight fraction.

2. Method of separating polymers comprising chain-like molecules of varying molecular weight into fractions of relatively high and relatively low average molecular weights which comprises forming a solution of said polymers and a saturated hydrocarbon solvent, contacting the solution with silica gel to selectively adsorb polymers of relatively low molecular weight while leaving relatively high molecular weight polymers in solution, separating from the adsorbent the treated solution containing the high molecular weight fraction and washing the used adsorbent with a desorbing agent to remove the relatively low molecular weight fraction.

3. Method of separating polymers comprising chain-like molecules of varying molecular weight into fractions of relatively high and relatively low average molecular weights which comprises forming a solution of said polymers and a saturated hydrocarbon solvent, contacting the solution with silica gel to selectively adsorb polymers of relatively low molecular weight while leaving relatively high molecular weight polymers in solution, separating from the adsorbent the treated solution containing the high molecular weight fraction, washing the used adsorbent with an organic primary desorbing agent to remove the relatively low molecular weight fraction, said primary desorbing agent being more strongly adsorbable than said low molecular weight polymers but not so strongly adsorbable as to have an "adsorption index" exceeding 40, and then washing the adsorbent with a saturated hydrocarbon liquid to effect desorption of the primary desorbing agent and thereby reactivate the adsorbent.

4. Method defined in claim 3 wherein the primary desorbing agent is a hydrocarbon of the benzene series.

5. Method defined in claim 3 wherein the primary desorbing agent is ethylene dichloride.

6. Method of separating polymers comprising chain-like molecules of varying molecular weight into fractions of different average molecular weights which comprises forming a solution of said polymers and a saturated hydrocarbon solvent, percolating the solution through a bed of silica gel to selectively adsorb a portion of the polymers while leaving in solution polymers of higher average molecular weight than those adsorbed and separating from the adsorbent the treated solution containing the polymers of higher average molecular weight.

JOHN R. SKEEN.

REFERENCES CITED

The following references are of record in the file of this patent:

UNITED STATES PATENTS

| Number | Name | Date |
| --- | --- | --- |
| 2,316,774 | Dunmire et al. | Apr. 20, 1943 |
| 2,375,596 | Strickland | May 8, 1945 |

OTHER REFERENCES

Laboratory Technique in Organic Chemistry, by A. A. Morton, pub. 1938 by McGraw-Hill Book Co., Inc., New York, pages 187–188.